United States Patent [19] [11] 4,112,720
Green [45] Sep. 12, 1978

[54] BICYCLE LOCK ASSEMBLY

[76] Inventor: Leonard O. Green, 620 E. Pine, Santa Ana, Calif. 92701

[21] Appl. No.: 746,486

[22] Filed: Dec. 1, 1976

[51] Int. Cl.² .......................................... E05B 71/02
[52] U.S. Cl. ........................................ 70/233; 70/30; 70/DIG. 57
[58] Field of Search ................. 70/30, 49, 58, 233, 70/234, 235, 236, 422, 451, DIG. 57, 225, 227; 211/5

[56] References Cited

U.S. PATENT DOCUMENTS

| 177,806 | 5/1876 | Cook et al. | 70/451 X |
| 2,929,649 | 3/1960 | Coe | 70/451 X |
| 3,435,642 | 4/1969 | Pesco | 70/49 |
| 3,670,535 | 6/1972 | Stettner et al. | 70/30 X |
| 3,781,861 | 12/1973 | Adler et al. | 70/233 X |
| 3,824,540 | 7/1974 | Smith | 70/233 X |
| 3,877,261 | 4/1975 | Robins | 70/451 X |
| 3,903,719 | 9/1975 | Katz | 70/234 X |
| 3,906,758 | 9/1975 | Hurwitt | 70/233 X |
| 3,969,914 | 7/1976 | Dennen | 70/234 |

Primary Examiner—Roy D. Frazier
Assistant Examiner—Thomas J. Holko
Attorney, Agent, or Firm—William C. Babcock

[57] ABSTRACT

A bicycle lock assembly that is permanently mounted on the frame of a two-wheeled vehicle adjacent the rear wheel of the latter, with the assembly including a key-operated or combination lock as a part thereof. An elongate cable is supported by a spring-loaded reel within the assembly. The cable on the free end thereof has a T-shaped rigid member. When the cable is looped between the spokes of the rear wheel, the T-shaped member may be removably engaged by the assembly through the manipulation of the lock that forms a part thereof, and the cable preventing movement of the bicycle by concurrent rotation of both the front and back wheels thereof.

2 Claims, 6 Drawing Figures

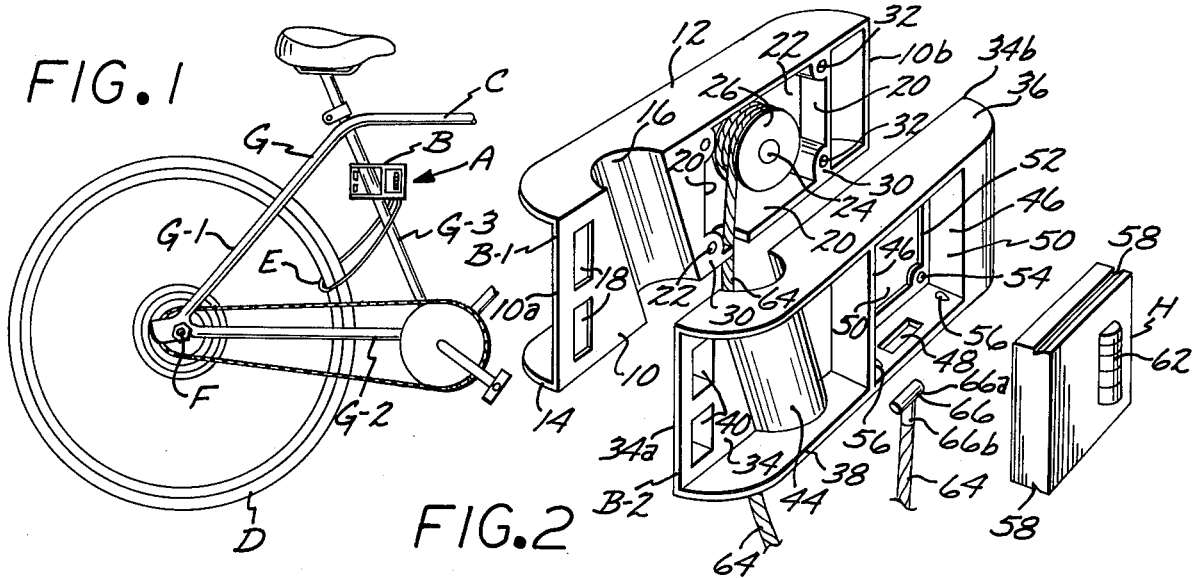
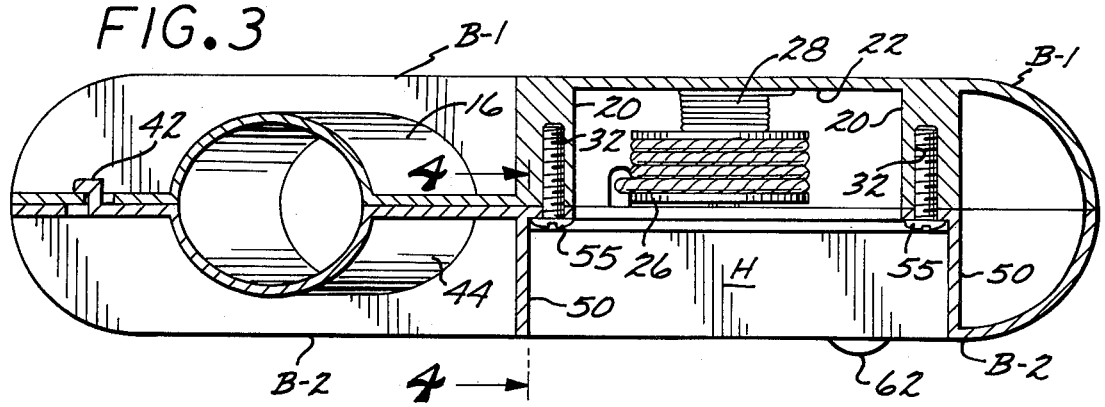
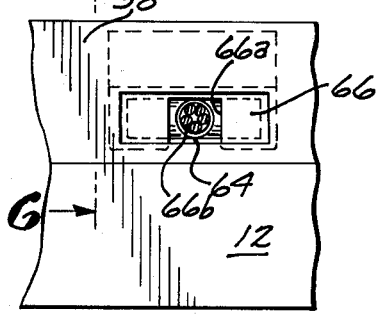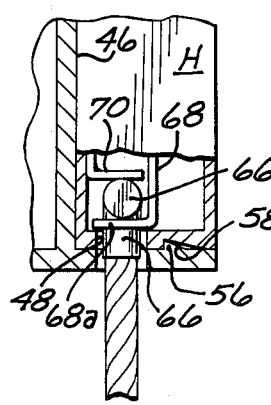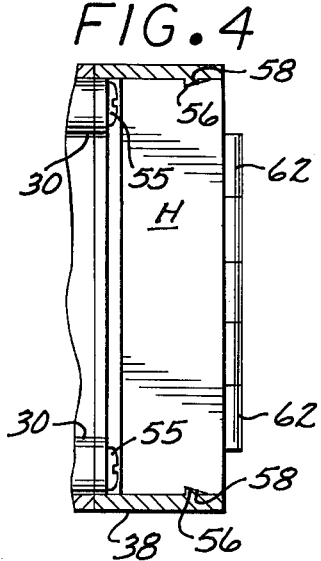

BICYCLE LOCK ASSEMBLY

BACKGROUND OF THE INVENTION

1. Field of the Invention

Bicycle Lock Assembly

2. Description of the Prior Art

In the past, numerous multiple piece locking devices have been devised and used to maintain either a front or rear wheel of a bicycle in a non-rotatable position relative to the frame, in an effort to prevent the stealing of a bicycle on which such a prior art device is mounted.

Such prior art devices have the operational disadvantage that the multiple parts thereof may become inadvertently separated, and the prior art device no longer capable of performing its intended function.

A major object of the present invention is to overcome the above-mentioned operational disadvantage of prior art devices by providing a bicycle lock assembly in which the components thereof at all times remain in an operative relationship in which they cannot be separated from one another, and the possibility of the components of the ivention being inadvertently separated to prevent it serving a locking function being eliminated.

A still further object of the invention is to furnish a bicycle lock assembly that has a simple mechanical structure, can be fabricated from standard commercially available material, is simple and easy to use, requires a minimum of maintenance attention, and may be sold at a sufficiently low price as to encourage the widespread use thereof.

SUMMARY OF THE INVENTION

A bicycle lock assembly that includes first and second mating sections that by screws may be mounted on a portion of a bicycle frame adjacent a front or rear wheel of the latter, and the second section capable of having either a key or combination lock permanently snapped into place therein to conceal the screws. The first and second sections cooperate to define a housing that is permanently secured to the bicycle frame, due to the screws being concealed by the lock, and the lock preventing access to the screws to allow the housing to be removed from the bicycle frame.

The housing supports a spring-loaded reel on which a pliable cable is wound, and which cable extends through an opening in the first section. The cable on the free end has a T-shaped rigid member secured thereto. The cable may have a desired length thereof withdrawn from the housing which is then looped between the spokes of the bicycle wheel most adjacent the invention, with the T-shaped member then extended through an opening in the housing to be engaged by a movable bolt member that forms a part of the lock when the bolt member is in a first position. By unlocking the lock, the bolt member may be moved to a second position where the T-shaped member may be withdrawn from the housing. After the T-shaped member is so withdrawn, the spring-loaded reel will automatically retract the cable into the housing, with the T-shaped member being in abutting contact with the latter.

BRIEF DESCRIPTION OF THE DRAWING

FIG. 1 is a side elevational view of the rearward portion of a bicycle with the lock assembly invention holding the rear wheel in an inoperative position;

FIG. 2 is an exploded perspective view of the invention;

FIG. 3 is a longitudinal cross-sectional view of the invention;

FIG. 4 is a fragmentary cross-sectional view of the invention taken on the line 4—4 of FIG. 3;

FIG. 5 is a fragmentary bottom plan view of the invention; and

FIG. 6 is a fragmentary cross-sectional view of the invention taken on the line 6—6 of FIG. 5.

DESCRIPTION OF THE PREFERRED EMBODIMENT

The bicycle lock assembly A as shown in FIGS. 1 and 2 includes a housing B molded from a tough material capable of withstanding substantial impact without breaking. The housing is formed from first and second mating sections B-1 and B-2 the structure of which is shown in detail in FIG. 2.

The lock assembly A is illustrated in FIG. 1 as mounted on a bicycle C that has a rear wheel D that includes spokes E, which wheel is rotatably supported on a shaft F. Frame G includes frame members G-1, G-2 and G-3.

First section B-1 is defined by a first side wall 10 that has a first end 10a and second end 10b. First and second flanges 12 and 14 project outwardly from side wall 10 as shown in FIG. 2. An angularly disposed wall 16 of semi-circular transverse cross-section extends between flanges 10 and 12 as shown in FIG. 2, with the radii of curvature of the interior surface of wall 16 being substantially the same as the exterior surface of frame member G-1. Side wall 10 has two spaced openings 18 therein adjacent the first end 10a. A number of spaced ribs 20 cooperate with flanges 10 and 12 to cooperate with an outwardly disposed portion of first side wall 10 to define a compartment 22. A transverse shaft 24 is situated in compartment 22 and rotatably supports a reel 26 that is spring loaded by a spring 28. The portions of ribs 20 adjacent first and second flanges 10 and 12 are of heavier structure and have tapped bores extending therein.

The second section B-2 is defined by a second side wall 34 that has third and fourth flanges 36 and 38 extending outwardly from the longitudinal sides thereof. Second side wall has a first end 34a and second end 34b. Second side wall 34 adjacent first end 34a has a pair of openings 40 formed therein from which L-shaped hooks 42 project, with the hooks capable of removably engaging the openings 18 to removably hold the sections B-1 and B-2 together in abutting mating relationship as shown in FIG. 3.

A second semi-cylindrical wall 44 extends between third and fourth flanges 38 and 36 and is adapted to be transversely aligned with the semi-cylindrical wall 16. Second side wall 34 has a number of second ribs 46 projecting outwardly therefrom that cooperate with the third and fourth flanges 36 and 38 to provide a transverse cavity 50 that has a frame 52 on an inner end thereof as shown in FIG. 2. A number of spaced openings 54 are formed in frame 52 that are transversely aligned with tapped bores 32. Screws 55 extend through openings 54 to engage tapped bores 32 as shown in FIG. 3, after hooks 42 have been caused to engage portions of the first side wall 10 adjacent the openings 18.

The portions of the third and fourth flanges 36 and 38 that partially define the cavity 50 have spaced tabs 56 projecting therefrom that engage recesses 58 formed in the upper and lower edges of a lock H of conventional design that is illustrated as being operable by proper manipulation of a number of insignia bearing dials 62.

A cable 64 has one end rigidly secured to the reel 26 on which the cable is wound. The free end of cable 64 has a rigid T-shaped member 66 rigidly secured thereto, which member includes a leg 66a as to be upwardly movable through an elongate opening 48 formed in fourth flange 38 between second ribs 46. The lock H has an opening 67 in the lower portion thereof as shown in FIG. 6 through which the leg 66a may be moved upwardly until the leg contacts a stop 70. The lock H includes a transversely movable bifurcated bolt 68 that slidably engages leg 66b of T-shaped member 66 as shown in FIG. 6, when the bolt is in a first position, and will not allow the leg 66a to move downwardly therethrough. When the dials 62 are manipulated to open lock H, the bolt moves to the right to a second position to permit the T-shaped member 66 to be withdrawn from the lock, and the cable automatically being drawn into housing B due to the spring-loading of reel 26.

The use and operation of the invention is extremely simple. The bicycle lock assembly A is mounted on a desired one of the frame members, as for instance frame member G-3 as shown in FIG. 1. Cable 64 is now pulled from housing B and looped between the spokes E and the T-shaped member 66 extending upwardly through opening 48. Lock H is now placed in a locked position for the bifurcated bolt 68 to engage T-shaped member 66, and the rear wheel D now being substantially non-rotatable relative to the bicycle frame G. When it is desired to use the bicycle A the above-described operation is reversed, with the cable due to the spring loaded reel 26 being drawn automatically into the housing B.

The use and operation of the invention has been described previously in detail and need not be repeated.

I claim:

1. In combination with a lock of the type that includes a substantially square body of substantial width that has a first opening therein that leads to a bifurcated bolt that may be selectively moved to either a first or second position by manually operated means that form a part of said lock, a support assembly for holding said lock in a fixed position on a tubular frame of a bicycle adjacent one of the wheels thereof, each of which wheels includes a plurality of circumferentially spaced radially extending spokes and a rim, said lock support assembly including:

a. first and second mating housing portions that interlock to engage a section of said frame adjacent one of said wheels, said first housing portion defining a confined spaced, said second housing defining a cavity that is transversely aligned with said confined space, said first and second housing portions cooperating to provide a housing when interlocked with one another, with said cavity of such size that said lock body fits snuggly therein to have said first opening axially aligned with a second opening in said second housing portion;
   b. first means for holding said first and second portions in interlocking relationship on said frame, said first means being concealed when said lock is disposed in said cavity;
   c. second means for maintaining said lock in a permanent position in said cavity with said first and second openings axially aligned;
   d. a cable that has first and second ends;
   e. a spring loaded reel rotatably supported in said confined space, said first end of said cable secured to said reel, with said cable wound on said reel, and a portion of said cable extending outwardly through a third opening in said housing; and
   f. a rigid T-shaped member rigidly secured to said second end of said cable, said T-shaped member including a first leg normal to said second end of said cable and a second leg axially aligned with said cable, with said cable when partially withdrawn from said housing, subsequently looped between spokes of one of said wheels, with said T-shaped member extended upwardly through said first and second openings being thereafter engaged by said bifurcated bolt when said lock is manually manipulated to move said bolt from said first to said second position and the looped portion of said cable maintaining the one of said wheels through which it extends in a substantially non-rotatable position to prevent the unauthorized riding of said bicycle.

2. A lock support assembly as defined in claim 1 in which said first means are a plurality of screws that extend through a plurality of openings in said second housing portion to engage a plurality of tapped openings in said first housing portion.

* * * * *